United States Patent

Greene

[11] Patent Number: 5,949,840
[45] Date of Patent: Sep. 7, 1999

[54] NEUTRON GUIDE

[75] Inventor: Geoffrey L. Greene, Los Alamos, N.Mex.

[73] Assignee: The Regents of the University of California, Los Alamos, N.Mex.

[21] Appl. No.: 09/200,363

[22] Filed: Nov. 25, 1998

[51] Int. Cl.[6] .................................................. G21C 11/06
[52] U.S. Cl. ..................... 376/458; 376/904; 250/505.1
[58] Field of Search ............................... 376/110, 202, 376/288, 340–345, 458, 904; 250/505.1, 390.1; 252/478

[56] References Cited

U.S. PATENT DOCUMENTS

| 3,924,132 | 12/1975 | Koslow | 376/159 |
|---|---|---|---|
| 4,157,277 | 6/1979 | Marmonier et al. | 376/254 |
| 4,582,999 | 4/1986 | Dance et al. | 250/505.1 |
| 5,016,267 | 5/1991 | Wilkins | 250/390.1 |
| 5,028,789 | 7/1991 | Whittemore | 250/505.1 |
| 5,167,912 | 12/1992 | Wood | 376/458 |
| 5,192,869 | 3/1993 | Kumakhov | 250/505.1 |
| 5,497,008 | 3/1996 | Kumakhov | 250/505.1 |
| 5,658,233 | 8/1997 | Peurrung | 250/251 |
| 5,880,478 | 3/1999 | Bishop et al. | 250/505.1 |

*Primary Examiner*—Daniel D. Wasil
*Attorney, Agent, or Firm*—Milton D. Wyrick

[57] ABSTRACT

A neutron guide in which lengths of cylindrical glass tubing have rectangular glass plates properly dimensioned to allow insertion into the cylindrical glass tubing so that a sealed geometrically precise polygonal cross-section is formed in the cylindrical glass tubing. The neutron guide provides easier alignment between adjacent sections than do the neutron guides of the prior art.

13 Claims, 2 Drawing Sheets

NEUTRON GUIDE

The present invention generally relates to the field of neutron scattering and nuclear physics research and more particularly to the neutron guides used to transport neutrons from a neutron source to neutron experimental facilities. This invention was made with Government support under Contract No. W-7405-ENG-36 awarded by the U.S. Department of Energy. The Government has certain rights in the invention.

BACKGROUND OF THE INVENTION

The use of neutrons in research activities has mushroomed in recent years. Neutron scattering techniques for material science investigations have been developed over many decades to the point at which they now are routinely used to determine the dynamic and structural properties of a material. Nuclear physics as well makes use of neutrons in its investigation of sub-atomic structure, among other things. Of course, the generation of neutrons for use is not trivial. At this point, an accelerator or reactor is required, and there are not a great number of those throughout the world.

In any case, to get neutrons from their source to the particular intended use, neutron guides are used. In many cases, numerous experiments are run from one neutron source, requiring that numerous runs of neutron guide are required to get the neutrons to each such experiment. Given the extremely high cost of the current guides and their installation, such endeavors carry with them an exorbitant expense.

Present neutron guides are generally of a rectangular cross-section, and are normally made of thick, coated glass, locked together at their edges. Prior art guides have their interior surfaces coated with such materials as nickel, copper or beryllium, or other material having a high coherent scattering cross-section for neutrons. Alternatively, some guides have been coated with a multi-layer, "supermirror," coating.

To be of use in exacting experiments, neutron guides must have a highly polished finish on the interior surfaces, and the geometrical alignment of the sides of the guide must be held to exacting standards. Currently available guides are constructed of plates of glass having a typical thickness of approximately 1–2 cm. The glass plates used are highly polished before their coatings are applied, and are assembled using great care to insure essentially perfect geometry. Because of the coatings, the polishing, and the precise assembly, present neutron guides are quite expensive, costing in the range of 10–15 thousand dollars per meter, installed.

The present invention can utilize an inexpensive form of glass that does not demand the expensive polishing that is required of the glass used in traditional neutron guide fabrication. Additionally, the present invention provides support for the glass guides in a manner that significantly reduces the assembly costs involved in fabrication of neutron guides.

It is therefore an object of the present invention to provide neutron guide apparatus that is easily fabricated.

It is another object of the present invention to provide neutron guide apparatus that has excellent mechanical rigidity.

It is yet another object of the present invention to provide neutron guide apparatus less costly to fabricate and install than prior neutron guides.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention comprises a predetermined length of cylindrical glass tubing with four rectangular flat sheets of glass dimensioned so as to allow insertion into the cylindrical glass tubing to form a sealed geometrically precise rectangular cross-section for passage of neutrons.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention provides a neutron guide that is structurally strong and much less expensive to fabricate and install than prior neutron guides. The invention can be understood most easily through to the drawings.

Figure 1:
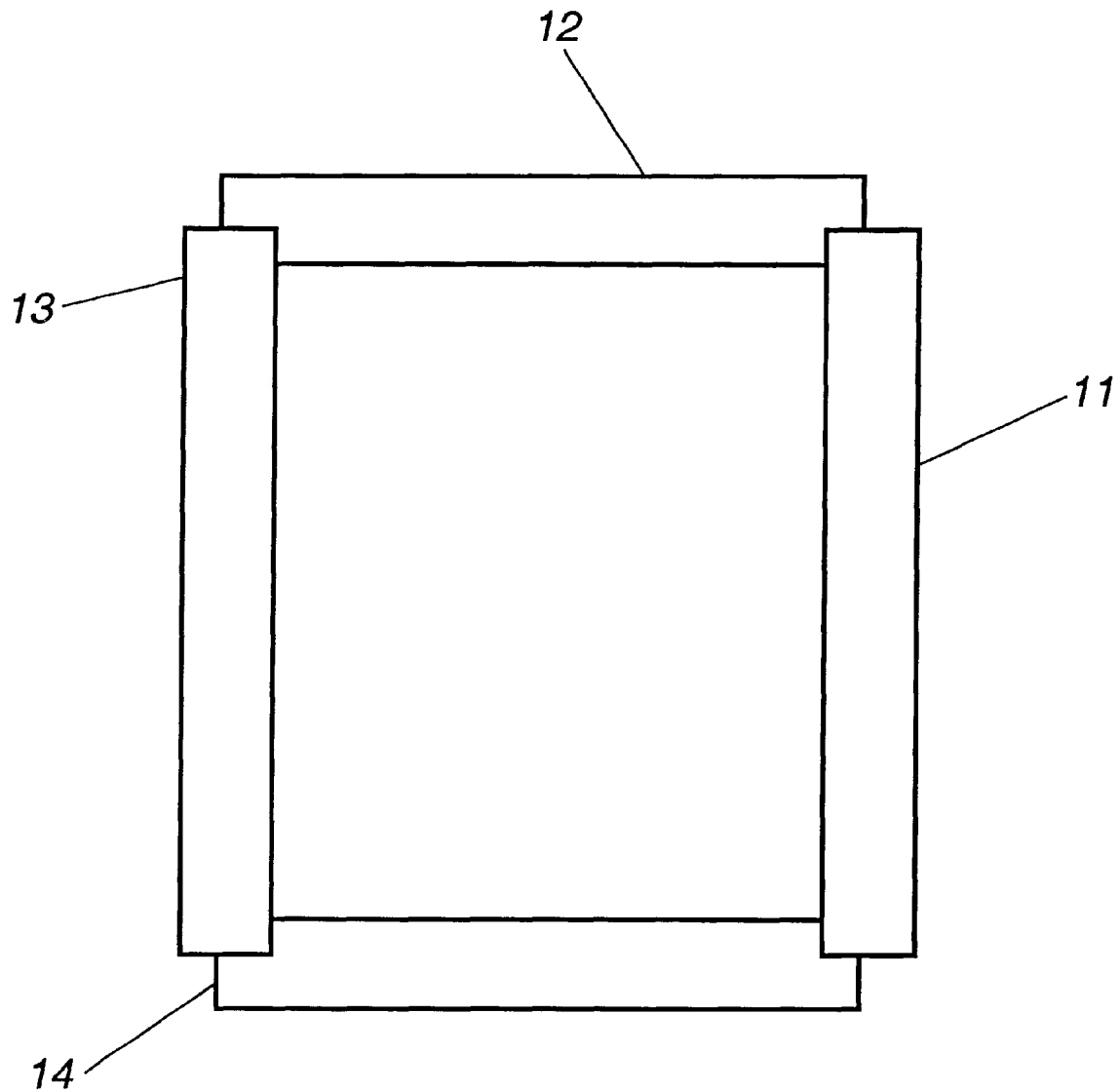
FIG. 1 is an illustration of the typical neutron guide of the prior art.

In FIG. 1, a typical prior art neutron guide is illustrated. As seen, most prior neutron guides consist of four relatively thick glass plates 11, 12, 13, and 14. Glass plates 11, 13 are rectangular plates of glass. Glass plates 12, 14 are rectangular plates of glass with notches cut into each side so that they mate securely with glass plates 11, 13. These neutron guides also generally come in approximately one meter lengths. To be effective, individual sections of guides must be precisely aligned and sealed. Individual sections of prior neutron guides are joined together usually through a time consuming optical method with associated sealing of the joints.

Figure 2:
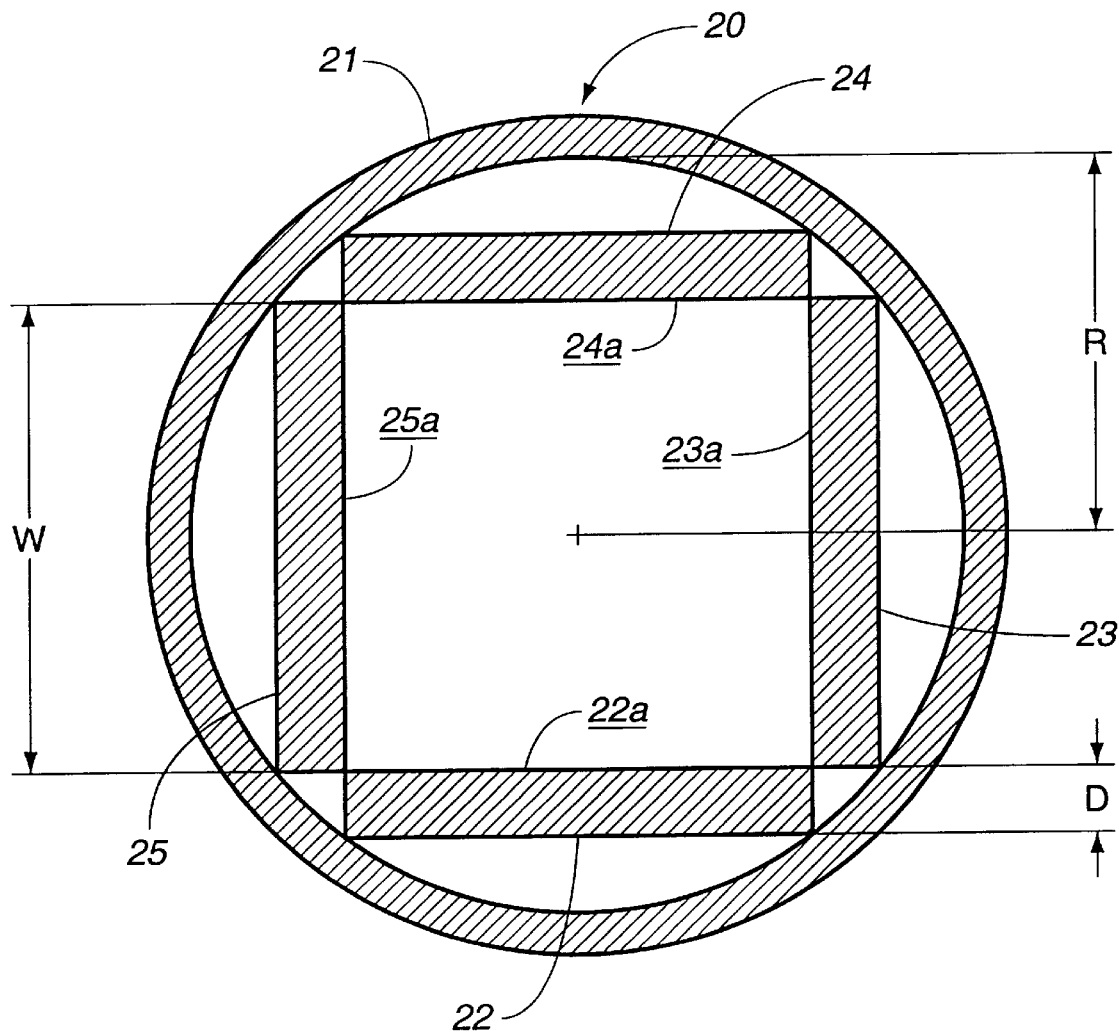
FIG. 2 is a schematic illustration of the neutron guide according to the present invention illustrating the relationship of the cylindrical glass tubing to the inserted rectangular glass plates for guiding neutrons.

Referring now to FIG. 2, there can be seen neutron guide 20, according to the present invention, wherein cylindrical glass tubing 21 encircles four rectangular glass plates 22, 23, 24 and 25. Cylindrical glass tubing 21 is extremely precise commercially available glass tubing, and assures the geometrical precision of neutron guide 20. Such glass tubing is commercially available from Wilmad Glass Co. located in New Jersey, U.S.A., as well as from other vendors. Cylindrical glass tubing 21 also provides the vacuum envelope for operation of neutron guide 20. Rectangular glass plates 22 are made of thin sheets of glass, which can be float glass, approximately 2-3 mm thick, and which, in the case of float glass, inherently provide a surface having an excellent finish. The present invention is able to make use of such economical thin sheets of glass because of the support provided by cylindrical glass tubing 21. The thin float glass that may be used in the invention possesses both the excellent surface finish and adequate geometrical precision, and is inexpensive.

These features of float glass serve to obviate the expensive and time-consuming finishing required for the glass used in prior art guides, and makes the present invention much more economical. Also related to economy is the ease by which cylindrical glass tubing simplifies the interconnection of individual sections of neutron guide 20.

Although neutron guide 20 is illustrated with its four rectangular glass plates 22, 23, 24 and 25 defining a square cross-section, it is to be understood that any possible rectangular or polygonal cross-section is feasible in practice of the invention. The exact dimensions for the four rectangular glass plates 22, 23, 24 and 25 (or more in the case of a polygonal cross-section) will depend on the parameters of the particular application for neutron guide 20.

Prior to insertion into cylindrical glass tubing 21, inner surfaces 22a, 23a, 24a, and 25a of the four rectangular glass plates 22, 23, 24 and 25 are coated with materials having a high coherent scattering cross-section for neutrons. These materials include nickel, copper, or beryllium. Alternatively, the inner surfaces 22a, 23a, 24a, and 25a may be coated with a multi-layer "supermirror" coating.

As is made clear by FIG. 2, cylindrical glass tubing 21 maintains the geometry of neutron guide 20, as well as serving as the vacuum envelope for neutron guide 20. With the prior art, as illustrated in FIG. 1, small cross-section neutron guides, those with sides in the range of a few inches, the relatively thick glass plates 11, 12, 13, and 14 allow the vacuum enclosure to be within the cross-section. However, at larger cross-sections, a separate enclosure about the neutron guide is required, further increasing the expenses incurred for installation and operation.

It is important for the present invention to have the inner bore of cylindrical glass tubing 21 define a true cylinder. It is also helpful, as will be hereinafter described, to have the outer surface of cylindrical glass tubing 21 ground so that it is coaxial with the inner bore. It also is important that, to a certain accuracy, rectangular glass plates 22, 23, 24 and 25 are rectangular, with all interfacial angles equal to 90°, or the particular angle to be created with a desired polygonal cross-section. With these conditions, and the outer edges of rectangular glass plates 22, 23, 24 and 25 lying at the inner surface of cylindrical glass tubing 21, as shown in FIG. 2, the inner surfaces 22a, 23a, 24a, and 25a of rectangular glass plates 22, 23, 24 and 25 all will be parallel to axis of the inner bore of cylindrical glass tubing 21.

This means that all four inner surfaces 22a, 23a, 24a, and 25a will be "square," and the alignment of neutron guide 20, section to section, can be accomplished conveniently and economically by aligning the axis of one section of cylindrical glass tubing 21 with the axis of the next. This makes the alignment of individual sections of neutron guide 20 much easier than the alignment procedure employed for prior art neutron guides. Alignment of sections of neutron guide 20 is based on the fact that cylindrical glass tubing 21 can be obtained with its outer surface ground so that it is coaxial with its inner surface to an accuracy of approximately 25 μm. This accuracy will provide adequate geometric precision for neutron guide 20.

It is preferable that the components of the present invention conform to certain requirements for accuracy of manufacture. For example, orientation of the outer surface of cylindrical glass tubing 21 should be "square" to within 20 seconds of arc ($10^{-4}$ radian). With this accuracy assumed, and with a section of neutron guide 20 being 500 mm in length, rectangular glass plates 22, 23, 24 and 25 being "square" within an accuracy of 25 μm, and cylindrical glass tubing 21 being cylindrical inside and out within an accuracy of 25 μm, the alignment error will be within the desired tolerance.

In achieving this tolerance, the following equation is employed:

$$W=(2R^2-D^2)^{1/2}-D, \qquad 10$$

where W is the width and D is the thickness of rectangular glass plates 22, 23, 24 and 25, and R is the inner radius of cylindrical glass tubing 21, as shown in FIG. 2. The solution of equation 10 assures that the ends of each rectangular glass plates 22, 23, 24 and 25 will contact each adjacent plate and the inner surface of cylindrical glass tubing 21, as shown in FIG. 2.

In actual fabrication practice, the width W, as calculated, will be reduced slightly to facilitate assembly and ensure that rectangular glass plates 22, 23, 24 and 25 are not overly stressed inside cylindrical glass tubing 21. Neutron guide 20 can be easily fabricated by placing each of rectangular glass plates 22, 23, 24 and 25, inside cylindrical glass tubing 21, and gluing with an appropriate glass cement.

One possible method for fabrication of neutron guide 20 sections follows. Initially, a suitable stock of float glass having appropriate flatness and surface finish is obtained. All pieces of float glass obtained from a particular production run should have the same thickness D (equation 10), which should be very well determined. Next, precision bore cylindrical glass tubing 21, with an inside diameter suitable for the intended application of neutron guide 20. This inside diameter must be carefully measured to provide an accurate value for R (equation 10). With D and R determined, equation 10 is used to calculate the value for W, or width of rectangular glass plates 22, 23, 24 and 25.

Next, rectangular glass plates 22, 23, 24 and 25 are ground to have a dimensional width, W, and a length equal to the length of cylindrical glass tubing 21. The grinding of the glass plates must be done carefully so that the width, W, is attained with accuracy better than ±25 μm, hopefully near to ±10 μm. It also is important that the sides of the glass plates are ground square and that the edges remain sharp so that a secure seal is provided both between individual rectangular glass plates 22, 23, 24 and 25, and between the glass plates and cylindrical glass tubing 21. This is the only grinding step required in the present invention. After grinding, one surface of each rectangular glass plate 22, 23, 24 and 25 is coated with an appropriate surface coating such as $^{58}$Ni or a multi-layer super mirror coating.

After the preceding steps have been completed, cylindrical glass tubing 21 would be placed in a supported, horizontal position and rectangular glass plate 22 is placed carefully inside cylindrical glass tubing 21 so that it lies in a horizontal position with its edges contacting the interior surface of cylindrical glass tubing 21 along its entire length. To accomplish this, an assembly may be helpful to lower the rectangular glass plate 22 in a controlled fashion. After proper placement of rectangular glass plate 22, the plate is cemented in place with any appropriate glass bonding cement.

After the placement of the rectangular glass plate 22, cylindrical glass tubing 21 is rotated slightly less than 90° and rectangular glass plate 23 (or 25) is inserted. Care must be exercised to ensure that rectangular glass plate 23 is in contact with the inner surface of cylindrical glass plate 21 and not overly constrained by the edge of rectangular glass plate 22. It may be helpful to place a very thin paper or piece of MYLAR® (thickness <25 µm) between adjacent edges of the glass plates to ensure that contact between the glass plates does not compromise the alignment naturally provided by cylindrical glass tubing 21. After placement, rectangular glass plate 23 also is cemented into position.

The preceding step is repeated for insertion of rectangular glass plate 24. After rectangular glass plate 24 is cemented into position, cylindrical glass tubing 21 is rotated a last time and rectangular glass plate 25 is carefully inserted into the remaining position. For rectangular glass plate 25, the width, W, is of critical importance, as it must provide sufficient clearance to allow rectangular glass plate 25 to slide gently into its proper position. After insertion, rectangular glass plate 25 is cemented into place.

At this point it is advisable to perform a metrological inspection of the assembled neutron guide 20 section using a contacting coordinate measuring machine to verify that the geometry of the neutron guide 20 section is within the described tolerances. If it is not, the cement joints can be dislodged, and the assembly process began anew.

After assembly has been successfully completed, more cement should be applied the joints between each of rectangular glass plate 22, 23, 24 and 25 and cylindrical glass tubing 21. This can be accomplished by tilting the neutron guide 20 section and allowing relatively low viscosity cement to flow along the contacting edges.

It will be recognized by those skilled in this art that the assembly process previously described is only one of many possible processes for the fabrication of neutron guide 20. There are likely other processes that also would provide successful fabrication. The important points of the present invention are the use of cylindrical glass tubing to maintain the required geometrical tolerances for the rectangular plates of glass and the necessary rigidity of the assembly, and to an extent, the use of inexpensive but well surfaced float glass.

It is to be understood that although the preceding assembly routine is directed to a rectangular cross-section neutron guide 20, similar assembly routines could be followed for cross-sections involving polygonal cross-sections where more than four rectangular glass plates would be used.

The present invention is not to be limited to only a rectangular cross-section, but includes any polygonal cross-section that is appropriate and practical for fabrication within cylindrical glass tubing 21. This includes, but is not limited to rectangular, pentagonal, hexagonal and octagonal cross-sections.

The foregoing description of the embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A neutron guide comprising:
   a predetermined length of cylindrical glass tubing;
   at least four rectangular flat sheets of glass dimensioned so as to enable insertion into said cylindrical glass tubing to form a sealed geometrically precise polygonal cross-section for passage of neutrons.

2. The neutron guide as described in claim 1, wherein said at least four rectangular flat sheets of glass comprise float glass.

3. The neutron guide as described in claim 1, wherein said geometrically precise polygonal cross-section comprises a geometrically precise square cross-section.

4. The neutron guide as described in claim 1, wherein said geometrically precise polygonal cross-section comprises a geometrically precise rectangular cross-section.

5. The neutron guide as described in claim 2, wherein said float glass is coated with a layer of nickel.

6. The neutron guide as described in claim 2, wherein said float glass is coated with a layer of copper.

7. The neutron guide as described in claim 2, wherein said float glass is coated with a multi-layer "supermirror" coating.

8. A neutron guide comprising:
   a predetermined length of cylindrical glass tubing;
   four rectangular flat sheets of glass dimensioned so as to enable insertion into said cylindrical glass tubing to form a sealed geometrically precise rectangular cross-section for passage of neutrons.

9. The neutron guide as described in claim 8, wherein said four rectangular flat sheets of glass comprise float glass.

10. The neutron guide as described in claim 8, wherein said geometrically precise rectangular cross-section comprises a geometrically precise square cross-section.

11. The neutron guide as described in claim 9, wherein said float glass is coated with a layer of nickel.

12. The neutron guide as described in claim 9, wherein said float glass is coated with a layer of copper.

13. The neutron guide as described in claim 9, wherein said float glass is coated with a multi-layer "supermirror" coating.

* * * * *